(12) United States Patent
Xu

(10) Patent No.: US 8,539,972 B2
(45) Date of Patent: Sep. 24, 2013

(54) LOW CONSUMPTION AND INTELLIGENT SAFE GAS-SUPPLY SYSTEM USING GAS TANKS

(75) Inventor: Huanen Xu, Beijing (CN)

(73) Assignee: Beijing Bolken Equipment Corporation, Beijing (CN)

( * ) Notice: Subject to any disclaimer, the term of this patent is extended or adjusted under 35 U.S.C. 154(b) by 692 days.

(21) Appl. No.: 12/668,306

(22) PCT Filed: Jul. 11, 2008

(86) PCT No.: PCT/CN2008/071615
§ 371 (c)(1),
(2), (4) Date: Jan. 8, 2010

(87) PCT Pub. No.: WO2009/006852
PCT Pub. Date: Jan. 15, 2009

(65) Prior Publication Data
US 2010/0193045 A1 Aug. 5, 2010

(30) Foreign Application Priority Data
Jul. 12, 2007 (CN) .......................... 2007 1 0118659

(51) Int. Cl.
*F17D 1/04* (2006.01)
(52) U.S. Cl.
USPC .......................................... 137/266; 137/255
(58) Field of Classification Search
USPC .......................... 137/266, 255, 263
See application file for complete search history.

(56) References Cited

U.S. PATENT DOCUMENTS

| 3,719,196 | A | 3/1973 | McJones et al. | |
| 6,561,209 | B2 * | 5/2003 | Wojan et al. | 137/79 |
| 7,311,116 | B2 * | 12/2007 | Lillis | 137/256 |
| 7,484,521 | B2 * | 2/2009 | Kimbara et al. | 137/266 |
| 2006/0118175 | A1 | 6/2006 | Mathison et al. | |

FOREIGN PATENT DOCUMENTS

| CN | 1010863222 | 12/2007 |
| JP | 2001-295996 | 10/2001 |
| JP | 2004-084808 | 3/2004 |
| JP | 2004-293752 | 10/2004 |

OTHER PUBLICATIONS

International Search Report for PCT Counterpart Application No. PCT/CN2008/071615, 4 pgs. (Sep. 2, 2008).

* cited by examiner

*Primary Examiner* — Kevin Lee
(74) *Attorney, Agent, or Firm* — Maschoff Brennan

(57) ABSTRACT

A low consumption and intelligent safe gas-supply system using gas tanks comprises: at least two gas tanks and gas tank valves installed on them, charge valves with check valve, at least two gas-filled parallel unit pipes, high-pressure sensor, at least two gas-supply parallel unit pipes, gas-supply main conduit, reset pressure sensor, at least two solenoid valves with check valve, and electronic control module ECM. The invention has the characteristics such as the gas tanks supply gas in sequence, intelligent control, security and reliability for use, low consumption, high display precision for gas volume, decompression transfinite alarm and convenience for installing, use and maintenance etc., and it can be used in the vehicle hydrogen supply system in the fuel cell vehicles or the vehicle compressed natural gas-supply system in the natural gas vehicles, and also the high-pressure hydrogen or natural gas-supply system for gas tanks on the ground.

12 Claims, 4 Drawing Sheets

LOW CONSUMPTION AND INTELLIGENT SAFE GAS-SUPPLY SYSTEM USING GAS TANKS

CROSS REFERENCE TO RELATED APPLICATION

This patent application is a U.S. National Phase application under 35 U.S.C. §371 of International Application No. PCT/CN2008/071615, filed on Jul. 11, 2008, entitled LOW CONSUMPTION AND INTELLIGENT SAFE GAS-SUPPLY SYSTEM FOR GAS TANKS, which claims priority to Chinese patent no. 200710118659.7, filed on Jul. 12, 2007. The disclosure of the above-identified applications is incorporated by reference herein in its entirety.

TECHNICAL FIELD

The present invention relates to a vehicle hydrogen supply system used in fuel cell vehicles or vehicle hydrogen and compressed natural gas supply system used in the natural gas vehicles, and high-pressure hydrogen or natural gas supply system for gas tanks on the ground.

BACKGROUND OF THE INVENTION

It is well-known, the oil resources around the world become increasingly depleted, and the development of human society causes great damage and pollution to the environment, which make countries around the world begin to look for more environmental, replaceable and renewable energy sources. Hydrogen, as one of the most abundant element in the universe, is clean, renewable and has high density of energy, and is considered the most promising replaceable energy source in the future. With the improvement of fuel cell technology, hydrogen energy has been used in the vehicles.

The hydrogen supply system is one of the most unsafe factors for hydrogen fuel cell vehicles. Hydrogen is of the lowest density, the most flammable, easy to explode, and of the highest energy among all gases, therefore, the above characteristics of the hydrogen can not be ignored, and in the world an important concept of "hydrogen safety" has been clearly presented in the beginning of developing hydrogen fuel cell vehicles. In the development of vehicle high-pressure hydrogen supply system, the same technical route is adopted almost all over the world, that is to continue the development foundation of the gas-supply system for natural gas vehicle, to use for reference its technique, criterions and standards, and to gradually improve it according to the characteristics of the vehicle high pressure hydrogen supply system. In order to improve the driving mileage of fuel cell vehicles, car manufacturers want to increase the work pressure of the hydrogen supply system from 20 MPa to 35 MPa, and further put forward the object of increasing to 70 MPa, so the security and reliability of the hydrogen supply system is particularly prominent and important.

In China, the research on the supply system of natural gas vehicles begins with the use of single fuel of natural gas in large scale on the buses in Beijing since 1999. The researches are mainly on the security and reliability of the system (failure mode, fault tree, dangers analysis and corrective measures). Automatic overflowing protection devices are added etc. Some corresponding utility models have been published, but there is no publication of inventions or other relating documents about the present low consumption and intelligent safe gas-supply system in which the gas tanks are opened in sequence; In other countries, the improvement of the natural gas vehicle gas-supply system is also mainly on the improvement of the security and reliability, and there are some corresponding publication of patents or public documents, but there is still no publication of patents or other relating documents about the present low consumption and intelligent safe gas-supply system in which the gas tanks are opened in sequence. For the gas storage pressure of gas tanks which is higher than 20 MPa (such as 35 MPa or more than 70 MPa), that the gas tanks are opened in sequence, so as to provide a safe, reliable, low consumption and intelligent gas-supply system for hydrogen fuel cell vehicle, is the developing direction and trend of the relating technical field and also the background requirements of the present invention.

In recent years, in China, the research on fuel cell vehicles develops greatly for further engineering practice. Hydrogen supply system is one of the most important research areas, and at present there is no publication of relating patents and papers; in other countries, the patent application "HYDROGEN VEHICLE GAS UTILIZATION AND REFUELING SYSTEM" which is invented by Steven R. Mathison and Shiro Matsuo's (the application number is US2006/0118175A1) is published in U.S. in June 2006. This application mainly describes the control structure of the high pressure hydrogen supply system for vehicle or gas filling station. In this application, the hydrogen storage system and supply system are connected to the gas tank valve respectively and are separated at the gas tank mouth, and the core of the protection is: when supplying gas to fuel cells, gas tank conduit is opened respectively, so as to improve the efficiency of gas extraction and reduce the left hydrogen ratio in the gas tank. There is a pressure sensor on every gas tank of gas tanks, which is used as the criterion for gas tank solenoid valve opening. This invention is different from the present invention, and their protecting contents are different, and this invention doesn't present any solution to the security.

To rapidly advance researches on engineering of fuel cell vehicle, further improve the atmospheric environment, and improve people's living quality, researches on the hydrogen supply system of the fuel cell vehicles must follow the direction of security, reliability, low consumption and intelligence, which are also the background requirements of the present invention.

The present invention can be applied to the vehicle hydrogen supply system in the fuel cell vehicle or the vehicle compressed natural gas supply system in the natural gas vehicle, and high-pressure hydrogen or natural gas supply system for gas tanks on the ground.

SUMMARY OF THE INVENTION

The technical problems to solve of the present invention are to overcome the shortcomings of the prior arts and to provide a low consumption and intelligent safe gas-supply system using gas tanks with intelligent control, high security, high reliability, high energy efficiency, low consumption and high display precision of gas volume.

The technical solution of the invention: the system comprises at least two gas tanks and gas tank valves installed on them, a charge valve with check valve, at least two gas-filled parallel unit pipes, a high pressure sensor, at least two gas-supply parallel unit pipes, a gas-filled conduit, a gas-supply main conduit, a reset pressure sensor, at least two solenoid valves with check valve whose solenoid valve's gas conduit passage can be cut-off in reverse direction, and electronic control module ECM; the output gas conduit passage of the charge valve with check valve is connected to one end of every gas-filled parallel unit pipe through the gas-filled conduit, the other end of every gas-filled parallel unit pipe is connected to the check valve gas conduit passage which is at one end of the solenoid valve with check valve, one end of every gas-supply parallel unit pipe is connected to the solenoid valve gas conduit passage at the end of the solenoid valve with check valve or the other end of another check valve whose one end is connected to the solenoid valve gas conduit passage, the other end of the solenoid valve with check valve is connected to the gas tank valve through conduit, the other end of the gas-supply parallel unit pipe is connected to the gas-supply main conduit; the control signals export from ECM are input to every solenoid valve with check valve; the reset pressure sensor is installed on the gas conduit between the solenoid valve with check valve and the gas tank valve with pressure relief device, and its output is input to ECM; the high pressure sensor is installed on the gas-supply main conduit after the gas-supply parallel unit pipe, and its output is input to ECM, then ECM opens the solenoid valve with check valve in sequence according to the output of the high pressure sensor, so the gas tanks supply gas in sequence until gas-supply in the last gas tank is over; at the same time, according to the output of the reset-pressure sensor, the ECM automatically resets and stores the number of the gas tank which is supplying gas, so that when the system is power up, gas-supply begins from the gas tank.

The solenoid valve of the solenoid valve with check valve can be closed in reverse direction, the check valve gas conduit passage at one end of the solenoid valve with check valve is connected to the gas-filled parallel unit pipe, and the solenoid valve gas conduit passage at the end of the solenoid valve with check valve is connected to the gas-supply parallel unit pipe, the other end of the solenoid valve with check valve is connected to the gas tank; the solenoid valve with check valve is consisted of a pilot solenoid valve with check valve and another check valve whose one end is connected to the solenoid valve gas conduit passage at one end of the pilot solenoid valve with check valve, and the other end of the another the check valve which is connected to the end of the pilot solenoid valve with check valve is connected to the gas-supply parallel unit pipe, and the other end of the pilot solenoid valve is connected to the gas tank valve.

A pressure regulator is connected to the gas-supply main conduit which is set after the high-pressure sensor, decompressing high-pressure gas to low-pressure gas which is supplied to the following devices.

A low-pressure sensor is installed on the gas-supply main conduit after the pressure regulator, and its output is input to ECM, to monitor whether the pressure regulator works normally and execute closing for protection.

When the output pressure of the pressure regulator is beyond the design range but within +−10%, the low-pressure sensor will export a signal to ECM, and ECM will give an alarm; when the output pressure of the pressure regulator exceeds the design range more than +−10%, ECM will cut off all the actuating coil signals of the solenoid valve with check valve and give an alarm, so that all the gas tanks are in the closed state.

Gas filters are installed on both the gas-filled conduit and gas-supply main conduit, which are used to filter gas and prevent the function components on the gas-filled conduit and gas-supply main conduit from breaking down.

An overflowing protection device is installed on the gas-supply main conduit, when the gas flux in the gas-supply main conduit exceeds the design value, the gas may leak abundantly, at that time for further safe protection, the overflowing valve immediately opens, and exports the signal to ECM which closes the solenoid valve with check valve on the gas tank conduit which is supplying gas at the moment.

There are also solenoid valves included in the gas-supply main conduit, wherein a high-pressure solenoid valve is set before the pressure regulator and a low-pressure solenoid valve is set after the pressure regulator, whose outputs are exported to ECM.

A temperature sensor is installed on the gas conduit which connects one end of solenoid valve of the first the solenoid valve with check valve to the gas-supply parallel unit pipe, whose output exports to ECM, wherein the ECM modifies the left gas volume in the gas tank according to the gas temperature of the gas tanks and conduit which is detected by the temperature sensor, and exports pressure, volume and weight of the left gas, which makes the system measure the left gas volume more accurately.

The electronic control module ECM includes a microprocessor circuit, a actuating coil driving circuit and a voltage-stabilizing circuits; when power-on, according to the memory, the microprocessor circuit judges which gas tank is currently used from the at least two gas tanks and transmit this signal to the actuating coil driving circuit of the solenoid valve with check valve on this conduit, so as to open the solenoid valve and the corresponding gas tank start to supply gas; during the gas-supply process, the microprocessor circuit will receive the signal detected by the high-pressure sensor, close the gas-supply tank according to the logic judgment, open the next gas tank, and store the new gas tank number; when all the gas tanks are filled, the microprocessor circuit will reset the gas tank number, and store the gas tank number after restoration; the voltage-stabilizing circuit provides stable and reliable power supply for every circuit of ECM.

The microprocessor also has self-detection function, and can open the gas tanks one by one and check signals detected by the pressure sensors, if the set requirement is not met, give an alarm.

The microprocessor also has functions of controller area network (CAN) communication and modifying the gas volume display; through the CAN transceiver, the microprocessor circuit can send out alarm signal, gas tank closed signal and the current total volume of the left gas etc. to other circuits which have CAN communication function outside this system, and receive command of opening all the gas tanks, command of closing all the gas tanks and self-detection command from other CAN circuits.

The working principle of the invention is as follows: during the gas-filled process, the gas enters the filter through the charge valve with check valve, and after being filtered by the filter, the gas enters the gas-filled parallel unit pipes, and then the gas enters the corresponding check valve gas conduit of the solenoid valve with check valve through every conduit of the gas-filled parallel unit pipes, in the end the gas enters the gas tank with pressure relief device to complete the gas-filled process; during the gas-supply process, the prearranged primary gas tank supplies gas at first, and the other gas tanks don't supply gas, that is, just the solenoid valve with check valve on the gas conduit of the prearranged primary gas tank is power-on, so the solenoid valve of the solenoid valve with check valve is opened, and the gas in this primary gas tank passes through the gas tank valve with pressure relief device, the reset pressure sensor, the solenoid valve gas conduit of the solenoid valve with check valve and the temperature sensor, enters the gas-supply parallel unit pipe which the solenoid valve with check valve is in, if solenoid valve of the solenoid valve with check valve is a pilot solenoid valve, then the solenoid valve with check valve is consisted of the pilot solenoid valve with check valve and another check valve which is connected to the solenoid valve gas conduit passage at one end of the pilot solenoid valve, the gas in the gas tank enters the gas-supply parallel unit pipe through the another check valve which is connected to the solenoid valve gas conduit passage and then enters the temperature sensor, after that, the gas enters the gas-supply main conduit via the gas-supply parallel unit pipe, then the gas enters the filter after passing through the overflowing protection device and is filtered, in the end, it is decompressed from high pressure to low pressure by the pressure regulator and export; when the gas pressure in the gas-supply tank measured by the high-pressure sensor is lower than the preset pressure of the invention (normally 2.1 MPa), this signal is exported to ECM, and the output of the ECM will cut off the power of the solenoid valve with check valve in the gas tank conduit, accordingly, its solenoid valve gas conduit is closed, and the gas tank which is supplying gas currently is closed, and at the same time, ECM automatically resets and stores the sequence number of the gas tank which is supplying gas according to the output of the reset pressure sensor, so that when the system is power-on, gas is supplied by this gas tank at first, and then the gas-supply process of the first gas tank is repeated until gas-supply by the last gas tank is over. Compared to the prior arts, the present invention has the advantages as follows:

(1) It is innovative for the invention to measure the pressure by installing the pressure sensor on the gas conduit, which can avoid the complexity caused by installing the pressure sensor on the gas tanks, therefore for gas tanks which has two or more gas tanks, gas tanks are opened one by one in sequence to supply gas, which replaces the method in which all the gas tanks are opened to supply gas at the same time, so leakage of all the flammable gas due to emergency which happens in the situation of gas-supply by all the gas tanks can be avoided, particularly the harm caused by hydrogen, therefore the security and reliability of the gas-supply system using gas tanks are improved.

(2) In the invention, every gas tank is connected with a respective solenoid valve with check valve, so during the gas-supply process, only one gas tank of the gas tanks is opened to supply gas, and there is no need for all the gas tanks to open to supply gas, therefore the power consumption is equivalent to 1/n of the situation in which all the n gas tanks are opened (n is the number of tanks in the gas tanks, e.g. two or more), therefore, even though there is gas leakage due to unforeseen reasons, there is only one tank leaks, and the other gas tanks will not leak because of being closed, and besides, the extraction rate for a single gas tank is higher than that for all gas tanks supplying at the same time, which improves the energy efficiency, and lowers the power consumption.

(3) In the invention, a high pressure sensor is installed on the gas-supply main conduit, and its used as the main criterion according to which the gas tanks are opened to supply gas one by one in sequence, which can avoid the complexity caused by installing pressure sensor on every gas tank, and increase the reliability and ease of maintenance of the gas-supply system using the gas tanks.

(4) In the invention, by opening the solenoid valve with check valve on every gas tank conduit of gas tanks, gas is supplied in sequence. The high pressure sensor measures the left gas pressure in the using gas tank all the time, and the measurement error of the pressure sensor just represents the pressure error of this gas tank. So measurement precision is also improved from the bigger pressure error such as $+-\Delta$ which is measured in the situation of gas-supply by all the gas tanks to the current display measurement precision of $+-\Delta/n$.

(5) In the invention, a reset pressure sensor is installed on the first gas tank conduit among a number of gas tanks conduits. When the gas pressure in the gas tank which is detected by the reset pressure sensor is higher than the preset pressure (normally 3 MPa), it indicates that the gas tanks have been re-filled and all the gas tanks are full, or there is more than 3 MPa gas in the first gas tank, then the reset pressure sensor sends a signal to ECM, and ECM will automatically reset its sequence number and store it, at that time gas is supplied from this gas tank until gas-supply stops; when re-supply is needed, ECM sends signals to every solenoid valve with check valve in sequence by the stored sequence number of gas tanks, gas-supply in sequence goes on.

(6) The invention has the function of much safer and more protective. Mainly in the followings:

a. When the system is in work and the pressure measured by the high pressure sensor is higher than 20 MPa (the pressure can be preset, such as 20 MPa, 35 MPa, 70 MPa etc.), the electronic control module ECM will cut off the actuating coil signal of the solenoid valve with check valve which is connected to the working gas tank conduit, close the gas tank and give an alarm, then all the gas tanks are closed; b. When the low-pressure output pressure is lower than a certain value (normally 0.7 MPa) or higher than a certain value (normally 1.1 MPa), the low-pressure solenoid valve of the system will stop work immediately, cut off the output and give an alarm; c. When the gas flux in the gas-supply main conduit is higher than the preset value, overflowing protection device starts to work immediately to realize security protection; d. A low pressure sensor is used to monitor whether the pressure regulator works normally, when the output pressure of the pressure regulator is beyond the preset range, the low-pressure sensor sends a signal to ECM, and ECM controls to give an alarm, which can effectively monitor the pressure output state of the pressure regulator, and judge the failure appropriately and adopt corresponding measurements; e. ECM has the ability of closing in emergency, one way is to mount an external manual emergency shutoff button which is connected to the electronic control module ECM, when there is an emergency in which it needs to cut off the gas conduit, the driver can press this button, cut off the solenoid valve actuating coil circuit by ECM, close the solenoid valve and cut off the gas source. Only when the external manual emergency shutoff button is released from the shutoff state and is in a normal state, normal gas-supply can be resumed. The second way is that the other external shutoff command signal can output the shutoff signal by the CAN bus of ECM, so that all the gas conduits in the system is cut off.

(7) The electronic control module ECM adopted in the invention uses the microprocessor circuit to solve system control problems, which can simplify the control circuit, achieve intelligent control, and further increase the reliability.

(8) ECM of the invention has the function of CAN bus communication, it can conveniently send alarm signal, gas tank closed signal, the current left gas volume and so on to other circuits which have CAN communication function outside the system through CAN transceiver, and receive the command of opening all gas tanks, command of closing all gas tanks and self-detection command from other CAN circuits; and ECM also has the self-detection function, it can start self-detection by pressing the button or by the self-detection command from the external, which can further increase the security and reliability.

DETAILED DESCRIPTION OF THE INVENTION

Figure 1:
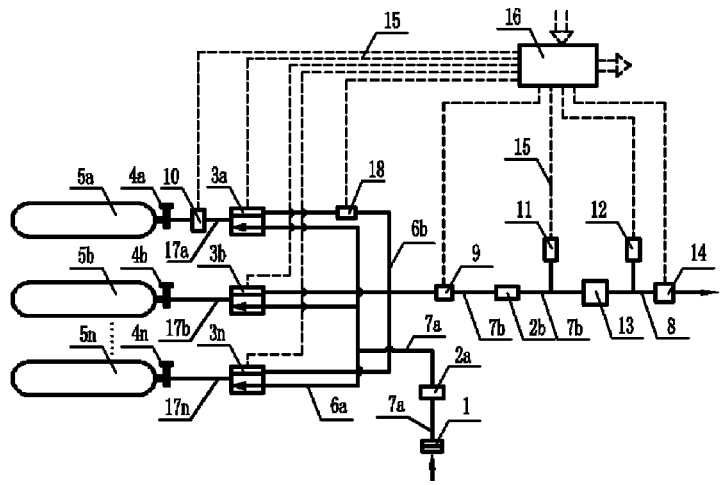
FIG. 1 shows the principle drawing of the invention.

As shown in FIG. 1, the example of the invention includes: gas conduit part and control part, wherein the gas conduit part includes charge valve 1, gas filter 2a located between gas-filled parallel unit pipes 6a and charge valve 1, and gas filter 2b located between pressure regulator 13 and gas-supply parallel unit pipes 6b, solenoid valve with check valve 3a, 3b, ... 3n, gas tank 5a, 5b, ... 5n and gas tank valve with pressure relief device 4a, 4b, ... 4n installed on it, gas-filled parallel unit pipe 6a, gas-supply parallel unit pipe 6b, overflowing valve 9, reset pressure sensor 10, high pressure sensor 11, low pressure sensor 12, pressure regulator 13, low-pressure solenoid valve 14, electronic control module ECM 16, temperature sensor 18 and connection conduits. Both gas-filled parallel unit pipes 6a and gas-supply parallel unit pipes 6b are several parallel conduits that merge at one end respectively. Divided by gas flowing direction, gas conduit part includes gas-filled conduit and gas-supply conduit. The connection of the gas-filled conduit is as follows: the charge valve with check valve 1 is connected to one end of the gas filter 2a by high-pressure gas conduit 7a, the other end of the gas filter 2a is connected to one end of every gas-filled parallel unit pipe 6a by high-pressure gas conduit 7a, the other end of every gas-filled parallel unit pipe 6a in the gas-filled conduit is connected to the gas conduit passage of the check valve which is at one end of the solenoid valve with check valve 3a, 3b . . . 3n, the other end of the solenoid valve with check valve 3a, 3b . . . 3n is connected to the gas tank valve with pressure relief device 4a, 4b . . . 4n by conduit 17a, 17b . . . 17n, the gas tank valve with pressure relief device 4a,4b . . . 4n is installed on the gas tank 5a, 5b . . . 5n, so that the gas-filled conduit is formed. The gas-supply conduit is to connect the gas tank valve with pressure release device 4a, 4b . . . 4n installed on gas tank 5a, 5b . . . 5n to one end of the solenoid valve device with check valve 3a, 3b . . . 3n by conduit 17a, 17b . . . 17n, the gas enters the solenoid valve gas conduit of the solenoid valve with check valve 3a, 3b . . . 3n, one end of every gas-supply parallel unit pipe 6b is connected to the solenoid valve gas conduit passage which is at one end of the solenoid valve with check valve 3a, 3b . . . 3n, if the solenoid valve is a pilot solenoid valve, the solenoid valve with check valve 3a, 3b . . . 3n includes the pilot solenoid valve with check valve and another check valve that is connected to the solenoid valve gas conduit passage of the pilot solenoid valve with check valve, the solenoid valve with check valve 3a, 3b . . . 3n is connected to every gas-supply parallel unit pipe 6b by the other end of the another check valve through conduit; the other end of every gas-supply parallel unit pipe 6b is connected to one end of the overflowing valve 9 which is on the main circuit 7b; the other end of the overflowing valve 9 is connected to one end of the gas filter 2b; the other end of the gas filter 2b is connected to one end of the pressure regulator 13 by conduit 7b; the other end of the pressure regulator 13 is connected to one end of the low-pressure solenoid valve 14 by low-pressure conduit 8; the other end of the low-pressure solenoid valve 14 is used to export the output of the low consumption and intelligent safe gas-supply system using gas tanks, and it can supply gas to corresponding device. The reset pressure sensor 10 is installed on the conduit 17a which connects the first gas tank valve with pressure relief device 4a to the solenoid valve with check valve 3a, the temperature sensor 18 is installed on the conduit of the gas-supply parallel unit pipe 6b through which the first gas tank valve 4a supplies gas, the high pressure sensor 11 and the low pressure sensor 12 locate on the high-pressure conduit 7b and the low-pressure conduit 8 respectively which are at the two ends of the pressure regulator 13. The solenoid valve with check valve has two examples: if the solenoid valve can be closed in reverse direction, then the solenoid valve gas conduit passage which is at one end of the solenoid valve with check valve is directly connected to every gas-supply parallel unit pipe; if the solenoid valve is a pilot solenoid valve, as it is not sealed in the reverse direction when its closed, then the solenoid valve with check valve is consist of the pilot solenoid valve with check valve and another check valve which is connected to the solenoid valve gas conduit passage of the pilot solenoid valve with check valve, and the other end of the another check valve is connected to corresponding gas-supply parallel unit pipe by conduit, the gas-supply parallel unit pipe is formed by merging every gas-supply parallel unit pipe at the output end, and the other end of the gas-supply parallel unit pipe is connected to gas-supply main conduit; the control part includes the electronic control module ECM 16, the solenoid valve with check valve 3a, 3b . . . 3n, the overflowing valve 9, the low-pressure solenoid valve 14, the reset-pressure sensor 10, the temperature sensor 18, the high pressure sensor 11 and the low pressure sensor 12. The actuating coils of the solenoid valve with check valve 3a, 3b . . . 3n, the overflowing valve 9 and the low-pressure solenoid valve 14 are connected to electronic control module ECM16 by corresponding wiring harness 15, which constitute system control loop and are controlled by the electronic control module ECM16; the output signals of the reset pressure sensor 10, the high pressure sensor 11, the low pressure sensor 12, the low-pressure solenoid valve 14 and the temperature sensor 18 are connected to the electronic control module ECM 16 by the corresponding wiring harness 15, which are the input signals to ECM16. The ECM16 communicates with the outside by CAN bus and can have the input of emergency shutoff signal and so on.

As shown in FIG. 1, the work principle of the invention is as follows: during the gas-filled process, gas enters the gas-filled parallel unit pipe 6a through the charge valve with check valve 1, the high-pressure conduit 7a, the gas filter 2a, and then is divided into n paths by the gas-filled parallel unit pipe 6a and enters n gas tank conduits, then enters the gas tank 5a, 5b . . . 5n through the check valve gas conduit of the solenoid valve with check valve 3a, 3b . . . 3n and the gas tank valve with pressure relief device 4a, 4b . . . 4n, so as to complete the gas-filled.

During the use, when the reset-pressure sensor 10 which is set on the gas-supply conduit of the gas tank 5a detects that the gas pressure of the gas tank 5a is higher than or equal to a preset pressure value (such as 3 MPa), it indicates that all gas tanks have been refilled and are full now, or that the gas tank 5a is still being used, the reset pressure sensor 10 will send the signal to ECM16, and ECM16 will automatically reset and store the sequence number of the gas tank 5a, then at that time gas will be supplied from this gas tank. When the system stops working or is powered on after power-off, ECM16 will send the signal to the solenoid valve with check valve in the conduit according to the stored gas tank sequence number, so the solenoid valve with check valve (one passage of 3a, 3b ... 3n) in the conduit is opened, and now the conduit begins to supply gas.

During the gas-supply process, one of the n gas tank conduits 17a, 17b ... 17n supplies gas and the other conduits don't supply gas, if the first gas-supply tank is preset to be 5a, then the gas in tank 5a enters the gas-supply parallel unit pipe 6b through the gas tank valve with pressure relief device 4a, the gas tank conduit 17a, the reset pressure sensor 10, the solenoid valve with check valve 3a and the temperature sensor 18, and is sent into gas-supply main conduit 7b by the gas-supply parallel unit pipe 6b, and then the overflowing valve 9 controls the gas flux, the gas filter 2b filters out the impurities in the gas, the high-pressure gas is decompressed to low-pressure gas by the pressure regulator 13 and the gas is exported through the output conduit of the low-pressure solenoid valve 14. When the gas pressure in the gas tank 5a detected by the high-pressure sensor 11 is below a preset pressure (such as 2.1 M Pa), this signal is sent to ECM16, and ECM16 will close the solenoid valve with check valve 3a which is on the gas-supply conduit of the gas tank. The above description of the invention has fully considered the reverse cut-off of the gas when the solenoid valve is closed, thereby the gas tank 5a which is supplying gas at the moment is closed due to the closing of the solenoid valve with check valve 3a. At the same time ECM16 stores the sequence number of the gas tank 5a, and opens the next gas tank 5b for supplying gas in sequence, the gas in the next gas tank 5b enters the gas-supply parallel unit pipe 6b through the gas tank valve with pressure relief device 4b in the conduit, the gas tank conduit 17b and the solenoid valve with check valve 3b, and then enters the gas-supply main conduit through the gas-supply parallel unit pipe 6b, and then the overflowing valve 9 controls the gas flux, the gas filter 2b filters out the impurities in the gas, the high-pressure gas is decompressed to low-pressure gas by the pressure regulator 13 and then the gas is exported through the output conduit of the low-pressure solenoid valve 14. When the gas pressure in the gas tank 5b detected by the high-pressure sensor 11 is below a preset pressure (such as 2.1 MPa), this signal is send to ECM16, and ECM16 will close the solenoid valve with check valve 3b which is on the gas-supply conduit of the gas tank, so that the gas tank 5b which is supplying gas at the moment is closed, and at the same time ECM16 stores the sequence number of the gas cylinder 5b, opens the next gas tank 5c in sequence until the last gas tank 5n is opened.

Because a single gas tank supplies gas in sequence and the measuring precision of left gas volume is improved, so that the gas extraction rate of the gas in gas tank increases and the lowest pressure of gas extraction is set 2.1 MPa in the invention. When all the gas pressure gained by ECM16 from the reset pressure sensor and the high pressure sensor are below 2.1 MPa, ECM16 will power all the actuating coils of the solenoid valves on the gas conduit, open all the solenoid valves, all gas tanks supply gas, and at the same time ECM16 raises an alarm; when the pressure sensor on the gas-supply conduit is below 1.5 MPa, ECM16 will cut off all the actuating coils of the solenoid valve on the gas conduit and all the solenoid valves, and raises an alarm at the same time. Accordingly, the efficiency of energy utilization increases.

During the gas-supply process, the low pressure sensor 12 is used to monitor whether the pressure regulator 13 works normally, and when the output pressure of the pressure regulator is within the planning range (that is, the low pressure is lower than 0.7 MPa, the high pressure is higher than 1.1 MPa), the low pressure sensor 12 will send a signal to ECM, and ECM will give an alarm; when the output pressure of the pressure regulator 13 exceeds the range, ECM will cut off all solenoid valves and give an alarm, so as to further increase the security.

Figure 2:
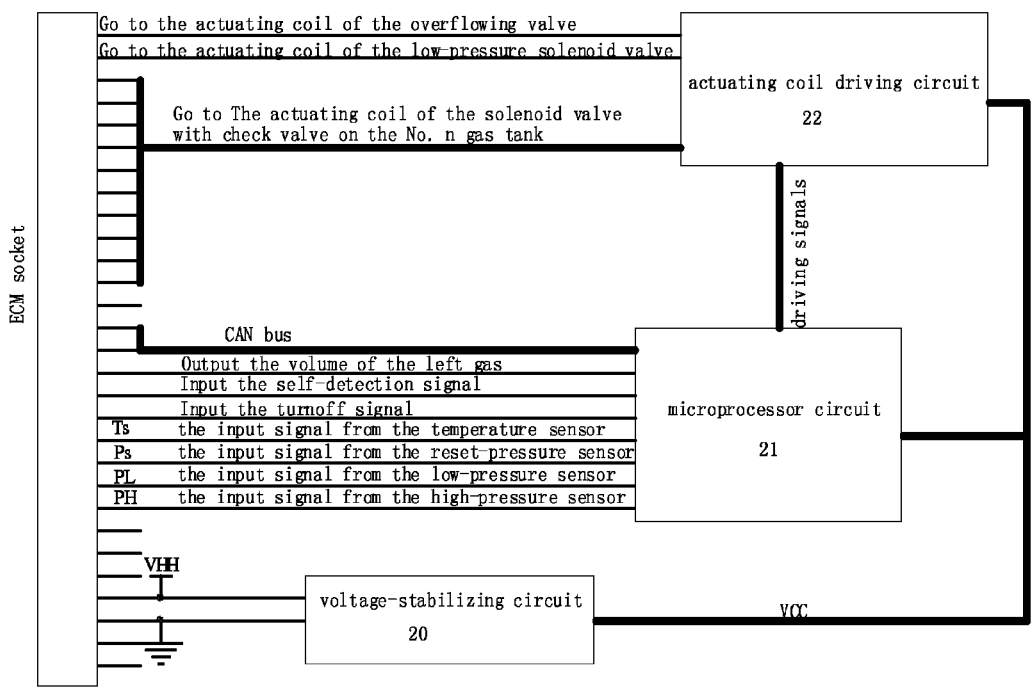
FIG. 2 shows the electronic principle drawing of the electronic control module ECM of the invention.
Figure 6:
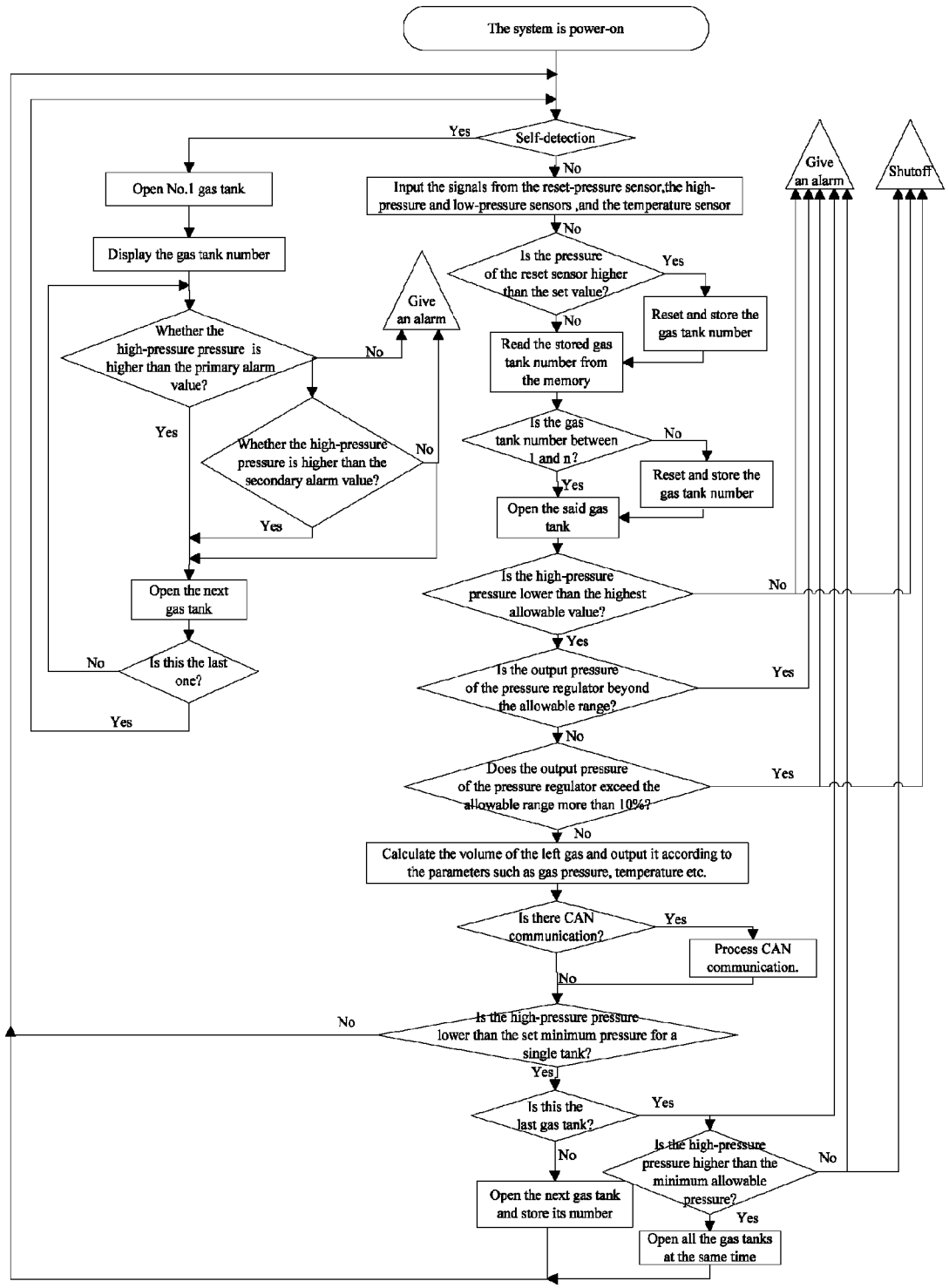
FIG. 6 shows the control flow chart of the ECM microprocessor of the invention.

As shown in FIG. 2, the electronic control module ECM16 of the invention mainly includes: voltage-stabilizing circuit 20, microprocessor circuit 21 and actuating coil driving circuit 22. The microprocessor circuit 21 is in charge of receiving the detection signals from the high pressure sensor 11, the low pressure sensor 13 and the reset pressure sensor 10, the input signal from the temperature sensor 18, storing gas tank's number, CAN communication with the external and processing the information, judging which gas tank is opened for gas-supply according to the software program, and then transmitting the solenoid valve driving signal of the conduit to the actuating coil driving circuit 22. wherein the actuating coil driving circuit 22 first magnifies the received driving signal, and then transmits it to the corresponding solenoid valve actuating coil, opens the corresponding gas tank conduit. The microprocessor circuit 21 further calculates and modifies the left gas volume and exports according to the stored gas tank's number and the signals from the high-pressure sensor 11 and the temperature sensor 18, turns power off according to the external emergency shutoff signal, carries out checking according to the external checking command or the checking command obtained by the CAN bus, judges the signals sent by the reset pressure sensor 10, the high pressure sensor 11 and the low pressure sensor 12. The main function control program achieved by the microprocessor circuit 21 is shown in FIG. 6. Besides, in order to ensure that every circuit is stable and reliable, the voltage-stabilizing circuit 20 is used, which stabilizes the power supply voltage outside the system at a constant value and supplies it to the microprocessor circuit 21 and the actuating coil driving circuit 22 for power supply.

Figure 3:
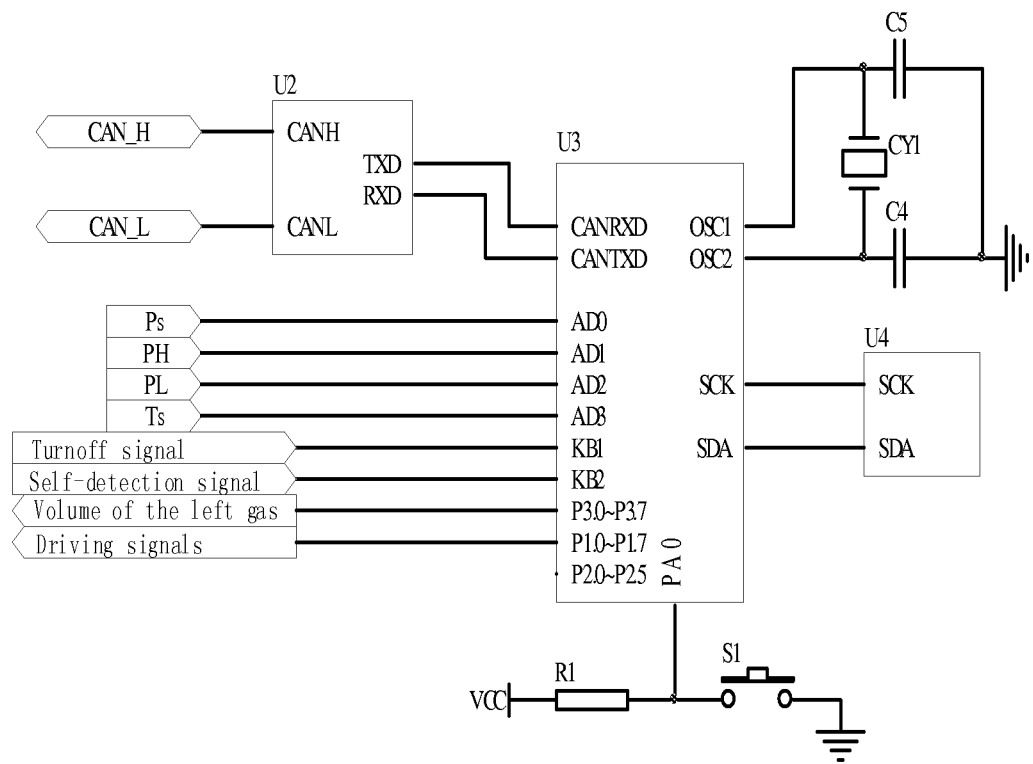
FIG. 3 shows the microprocessor circuit of the invention.

As shown in FIG. 3 it is the microprocessor circuit 21. When power on, the microprocessor U3 reads the gas tank's number in memory chip U4 and opens the gas tank conduit to supply gas to the system; At the same time, according to the received the detection signals from the high pressure sensor 11 and the low pressure sensor 13, microprocessor U3 judges logistically, so as to stop supplying gas from the current gas tank, open the next gas tank to supply gas, and also send the gas tank's number to U4 for storing when the switchover condition for gas tank is satisfied; After every gas tank is filled, according to the detection signal from the reset pressure sensor 10, the microprocessor U3 resets the gas tank number and sends it to U4 for storing. The microprocessor U3 carries out CAN communication by CAN transceiver U2 and sends alarm signal, gas tank closed signal, current gas volume and so on to other CAN circuits besides the system, and receives command of opening all gas tanks, command of closing all gas tanks and self-detection command from other CAN circuits, and also receives commands of compulsively closing the system and self-detecting by button itself. The self-detection function is mainly realized via orderly and alternately opening the gas conduit passage of the solenoid valve with check valve 3a, 3b ... 3n by the software in the microprocessor 21, measuring the left gas pressure in 5a, 5b ... 5n by the high pressure sensor 11, and via modifying the left gas volume in gas tank by Microprocessor U3 in the ECM16 according to the gas temperature in gas tanks and conduits which is gained by the temperature sensor and the high pressure sensor 11 and the current gas tank number, and also pressure, volume or weight of the left gas can be exported, so the system can measure the left gas volume more accurately. The microprocessor U3 closes all the solenoid valves when receiving the closing signal from the input port, and completes self-detection of the system when receiving the self-detection signal from the input port.

Figure 4:
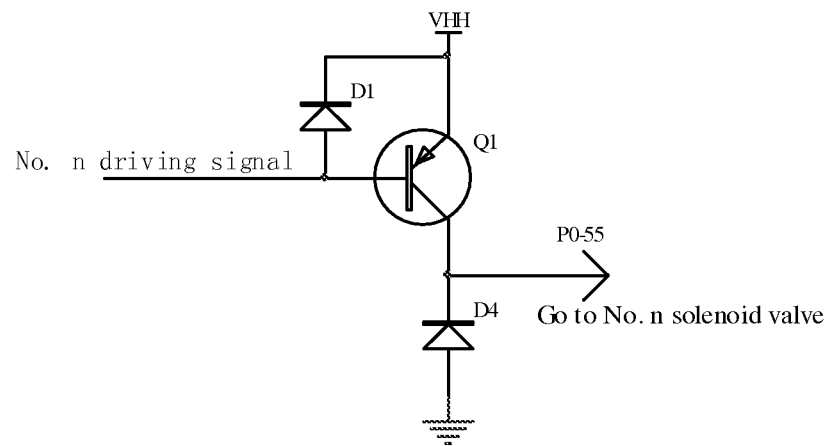
FIG. 4 shows the actuating coil driving circuit of the solenoid valve with check valve of the invention.

As shown in FIG. 4, it is the concrete implement method of the actuating coil driving circuit 22 of the solenoid valve in the No. n passage, and actuating coil driving circuits of the solenoid valves in the other passages are identical with this. The driving signal is input through the base of triode Q1, and when there is a high voltage level signal, Q1 conducts and the solenoid valve works. When the driving signal is low voltage level, Q1 closes and the solenoid valve stops working.

Figure 5:
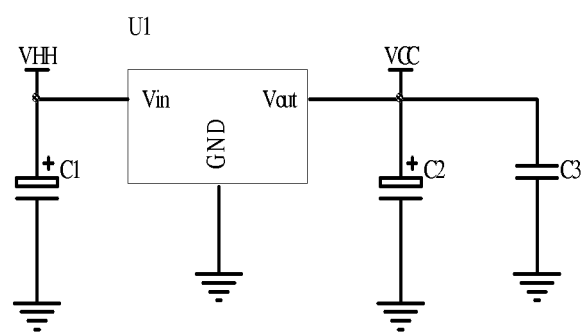
FIG. 5 shows the voltage-stabilizing circuit of the invention.

As shown in FIG. 5, it is the voltage-stabilizing circuit 20 of ECM16, which offers stable and continuous power for other circuits of the system by integrated circuit U1.

All the solenoid valves in the invention are normally-closed, and the situations of using pilot solenoid valve and double-direction-closed solenoid valve are taken into consideration. When the electronic control module ECM16 is power-off, all the gas tanks in the system are in the closed state by the normally-closed solenoid valve.

When the electronic control module ECM16 is power-on, it can close all the solenoid valves by the inner logic circuit when receiving the external compulsive closing signal by button.

As shown in FIG. 6, it is the work principle flow chart of the microprocessor in the invention. After the system is power-on, work according to the following steps:

(1) Firstly, decide whether the self-detection is carried out, if the self-detection is carried out, open every gas tank in sequence, and detect whether the pressure of every gas tank is normal, the self-detection process is as following:

a. Open No. 1 gas tank and show its gas tank number;
  b. Check whether the high-pressure pressure signal is higher than the preset primary alarm pressure (it means that whether the volume of the gas tank reaches the preset point after the gas tank is filled for the first time), that is whether $P_H$ is higher than 80% of the highest working pressure. For example when the highest pressure is 20 MPa, 16 MPa is preset to be the primary alarm pressure, if not, give an alarm; when the highest pressure is 35 MPa, 28 MPa is preset to be the primary alarm pressure, if not, give an alarm; when the highest pressure is 70 MPa, 56 MPa is preset to be the primary alarm pressure, if not, give an alarm;
  c. If the primary alarm pressure is not reached, check whether the high-pressure pressure signal is higher than the preset secondary alarm pressure (it means the preset point without filling gas after the gas tank is filled for the first time, or the minimum value of the left gas volume in gas tanks), for example whether P.sub.H is higher than 2 MPa, if not, give an alarm;
  d. Open the next gas tank and show its number;
  e. Repeat steps b-d;
  f. Check all the gas tanks in sequence; if it is the last gas tank, start from step (a);

(2) If self-detection doesn't needed, perform the following steps:
  a. Collect the input signals from the reset pressure sensor, the temperature sensor, the high pressure sensor and the low pressure sensor on the system conduits.
  b. Check whether the pressure signal from the reset sensor is beyond the preset value (such as 3 MPa), when the pressure signal from the reset sensor is beyond the preset value (such as 3 MPa), the number of the gas tank is reset to be the first gas tank number and the number is stored; when the reset pressure is not beyond the preset value, the gas tank number in the memory is read directly;
  c. Check whether the gas tank number is between 1 and n, if not, the gas tank number is reset to be the first gas tank number and the number is stored;
  d. Open the gas tank according to the memory;
  e. Check whether the high-pressure signal is lower than the highest allowable pressure (such as 20 MPa, also can be set to be 35 MPa or 70 MPa etc. according to the requirement), if not, give an alarm and close the gas tank;
  f. Check whether the low-pressure pressure exported by the pressure regulator 13 is beyond the allowance range, if so, give an alarm;
  g. Check whether the low-pressure pressure output by the pressure regulator 13 exceeds the allowable range by more than 10%, if so, give an alarm and close the gas tank;
  h. Calculate the left gas volume and export the signal according to parameters such as gas pressure, temperature etc.;
  i. If there is CAN communication signal, process the CAN communication signal;
  j. Check whether the high-pressure pressure output by the gas tank is lower than the lowest pressure preset for a single tank (such as 2.1 MPa), if not, follow the above steps (e) to (j), if so, follow the step (k);
  k. If the gas tank which is supplying gas currently is the last one, check whether the high-pressure pressure output by the gas tank is higher than the lowest allowable pressure (1.5 MPA), if so, open the solenoid valves 3a, 3b . . . 3n in all the supplying conduits and let all the gas tanks 5a, 5b . . . 5n supply gas; if not, give an alarm and close the gas tank; if its not the last gas tank, open the next gas tank to supply gas and repeat every step of the above (1) to (2).

ECM 16 in this invention can be merely consisted of control programs which achieve the same functions described above.

In a word, the invention has the characteristics such as intelligent control, security and reliability for use, low consumption, high display precision for gas volume, decompression transfinite alarm and convenience for installing, use and maintenance etc., and it can be used in the vehicle hydrogen supply system in the fuel cell vehicles or the vehicle compressed natural gas-supply system in the natural gas vehicles, and also the high-pressure hydrogen or natural gas-supply system for gas tanks on the ground.

The invention claimed is:

1. A low consumption and intelligent safe gas-supply system using gas tanks, wherein said system comprises at least two gas tanks and gas tank valves installed on the at least two gas tanks, a charge valve with a check valve, at least two gas-filled parallel unit pipes, a high pressure sensor, at least two gas-supply parallel unit pipes, a gas-filled conduit, a gas-supply main conduit, a reset pressure sensor, at least two solenoid valves each with a check valve with a solenoid valve with a gas conduit passage that can be cut-off in a reverse direction, and an electronic control module (ECM); an output gas conduit passage of the charge valve with check valve is connected to one end of every gas-filled parallel unit pipe through said gas-filled conduit, the other end of every gas-filled parallel unit pipe is connected to a check valve gas conduit passage which is at one end of the one solenoid valve with check valve, one end of every gas-supply parallel unit pipe is connected to a solenoid valve gas conduit passage at said end of one solenoid valve with check valve or the other end of another check valve whose one end is connected to said solenoid valve gas conduit passage, the other end of the solenoid valve with check valve is connected to the gas tank valve through conduit, the other end of the gas-supply parallel unit pipe is connected to the gas-supply main conduit; control signals export from the ECM are input to every solenoid valve with check valve; the reset pressure sensor is installed on the gas conduit between the solenoid valve with check valve and the gas tank valve with pressure relief device, and its output is input to the ECM; the high pressure sensor is installed on the gas-supply main conduit after the gas-supply parallel unit pipe, and its output is input to the ECM, then the ECM opens the solenoid valves with check valve in sequence according to the output of the high pressure sensor, so the gas tanks supply gas in sequence until gas-supply in the last gas tank is over; at the same time, according to the output of the reset pressure sensor, the ECM automatically resets and stores the number of the gas tank which is supplying gas, so that when the system is power up, gas-supply begins from said gas tank.

2. The low consumption and intelligent safe gas-supply system using gas tanks as claimed in claim 1, wherein: the solenoid valve of said solenoid valve with check valve can be closed in reverse direction, the check valve gas conduit passage at one end of said solenoid valve with check valve is connected to the gas-filled parallel unit pipe, and the solenoid valve gas conduit passage at said end of said solenoid valve with check valve is connected to the gas-supply parallel unit pipe, the other end of said solenoid valve with check valve is connected to the gas tank; said solenoid valve with check valve is consisted of a pilot solenoid valve with check valve and another check valve whose one end is connected to the solenoid valve gas conduit passage at one end of the pilot solenoid valve with check valve, and the other end of said another check valve which is connected to said end of said pilot solenoid valve with check valve is connected to the gas-supply parallel unit pipe, and the other end of said pilot solenoid valve is connected to the gas tank.

3. The low consumption and intelligent safe gas-supply system using gas tanks as claimed in claim 1, wherein in that a pressure regulator is connected to the gas-supply main conduit which is set after said high pressure sensor, decompressing high-pressure gas to low-pressure gas.

4. The low consumption and intelligent safe gas-supply system using gas tanks as claimed in claim 3, wherein a low-pressure sensor is installed on the gas-supply main conduit after said pressure regulator, and its output is connected to the ECM to monitor whether the pressure regulator works normally and execute closing for protection.

5. The low consumption and intelligent safe gas-supply system using gas tanks as claimed in claim 4, wherein when the output pressure of said pressure regulator is beyond a design range but within +10%, the low-pressure sensor will export a signal to the ECM, and the ECM will give an alarm; when the output pressure of the said pressure regulator exceeds a design range more than +10%, the ECM will cut off all actuating coil signals of the solenoid valve with check valve and give an alarm, so that all the gas tanks are in the closed state.

6. The low consumption and intelligent safe gas-supply system using gas tanks as claimed in claim 1, wherein gas filters are installed on both said gas-filled conduit and gas-supply main conduit, which are used to filter gas and prevent function components on the gas-filled conduit and gas-supply main conduit from breaking down.

7. The low consumption and intelligent safe gas-supply system using gas tanks as claimed in claim 1, wherein an overflowing protection device is installed on the gas-supply main conduit, when a gas flux in the gas-supply main conduit exceeds a design value, at that time for further safe protection, an overflowing valve immediately opens, and exports a signal to the ECM, which closes the solenoid valve with check valve on the gas tank conduit which is supplying gas at the moment.

8. The low consumption and intelligent safe gas-supply system using gas tanks as claimed in claim 1, wherein there are also solenoid valves included in said gas-supply main conduit, wherein a high-pressure solenoid valve is set before a pressure regulator and a low-pressure solenoid valve is set after the pressure regulator, whose outputs are exported to the ECM.

9. The low consumption and intelligent safe gas-supply system using gas tanks as claimed in claim 1, wherein a temperature sensor is installed on the gas conduit which connects one end of solenoid valve of a first of said solenoid valve with check valve to the gas-supply parallel unit pipe, whose output exports to the ECM, wherein said ECM modifies the left gas volume in the gas tank according to the gas temperature of the gas tanks and conduit which is detected by the temperature sensor, which makes the system measure a left gas volume more accurately.

10. The low consumption and intelligent safe gas-supply system using gas tanks as claimed in claim 1, wherein said electronic control module (ECM) includes a microprocessor circuit, a actuating coil driving circuit and a voltage-stabilizing circuit; when power-on, according to the memory, the microprocessor circuit judges which gas tank is currently used from the at least two gas tanks and transmit a signal to the actuating coil driving circuit of the solenoid valve with check valve on this conduit, so as to open the solenoid valve and the corresponding gas tank start to supply gas; during the gas-supply process, the microprocessor circuit will receive the signal detected by the high-pressure sensor, close the gas-supply tank according to logic judgment, open the next gas tank, and store the new gas tank number; when all the gas tanks are filled, the microprocessor circuit will reset the gas tank number, and store the gas tank number after restoration; the voltage-stabilizing circuit provides stable and reliable power supply for every circuit of the ECM.

11. The low consumption and intelligent safe gas-supply system using gas tanks as claimed in claim 10, wherein said microprocessor also has self-detection function, and can open the gas tanks one by one and check signals detected by the pressure sensors, if the set requirement is not met, give an alarm.

12. The low consumption and intelligent safe gas-supply system using gas tanks as claimed in claim 10, wherein said microprocessor also has a function of controller area network (CAN) communication and a function of modifying a gas volume display; through a CAN transceiver, the microprocessor circuit can send an out alarm signal, a gas tank closed signal and the current total volume of the left gas to other circuits which have CAN communication function outside this system, and receive command of opening all the gas tanks, command of closing all the gas tanks and self-detection command from other CAN circuits.

* * * * *